(12) United States Patent
Hosokawa

(10) Patent No.: US 8,373,770 B2
(45) Date of Patent: Feb. 12, 2013

(54) IMAGING DEVICE, IMAGING METHOD, AND PROGRAM INCLUDING AUTOMATICALLY CONTROLLING AN INTERVAL OF CONTINUOUS PHOTOGRAPHING

(75) Inventor: Satoshi Hosokawa, Tokyo (JP)

(73) Assignees: NEC Casio Mobile Communications, Ltd., Kawasaki-shi, Kanagawa (JP); NTT Docomo, Inc., Tokyo (JP)

(*) Notice: Subject to any disclaimer, the term of this patent is extended or adjusted under 35 U.S.C. 154(b) by 98 days.

(21) Appl. No.: 12/864,058

(22) PCT Filed: Feb. 16, 2009

(86) PCT No.: PCT/JP2009/053110
§ 371 (c)(1),
(2), (4) Date: Jul. 22, 2010

(87) PCT Pub. No.: WO2009/104776
PCT Pub. Date: Aug. 27, 2009

(65) Prior Publication Data
US 2010/0289917 A1 Nov. 18, 2010

(30) Foreign Application Priority Data

Feb. 20, 2008 (JP) ................................ 2008-039416

(51) Int. Cl.
*H04N 5/77* (2006.01)
(52) U.S. Cl. .................................... 348/231.1; 386/226
(58) Field of Classification Search ............. 348/231.99, 348/231.1; 386/224, 226
See application file for complete search history.

(56) References Cited

U.S. PATENT DOCUMENTS

| | | | | |
|---|---|---|---|---|
| 6,020,920 A | * | 2/2000 | Anderson | .................. 348/222.1 |
| 7,050,096 B2 | * | 5/2006 | Porter et al. | ............. 348/231.99 |
| 7,456,875 B2 | * | 11/2008 | Kashiwa | ....................... 348/239 |
| 2005/0001911 A1 | | 1/2005 | Suzuki | |
| 2005/0141772 A1 | | 6/2005 | Okada | |
| 2007/0013808 A1 | * | 1/2007 | Tagawa | ........................ 348/362 |

FOREIGN PATENT DOCUMENTS

| | | |
|---|---|---|
| JP | 1-174182 A | 7/1987 |
| JP | 02-248186 A | 3/1990 |
| JP | 3-252282 A | 11/1991 |
| JP | 6-165099 A | 6/1994 |
| JP | 2002199328 A | 7/2002 |
| JP | 2003087619 A | 3/2003 |

(Continued)

OTHER PUBLICATIONS

International Search Report for PCT/JP2009/053110 mailed Apr. 7, 2009.
Japanese Office Action dated Jun. 5, 2012 with English Translation of Examiner's Comments.

*Primary Examiner* — Timothy J Henn
(74) *Attorney, Agent, or Firm* — McGinn IP Law Group, PLLC

(57) ABSTRACT

In order to solve a problem in which a stable and continuous photographing operation cannot be realized, for example, the continuous photographing operation stops irregularly or the like in an imaging device, the imaging device includes imaging means for generating image data, a first buffer for storing the image data, and control means for controlling an interval of photographing by the imaging means to maintain a constant or according to a continuous function which decreases monotonically with respect to a remaining capacity of the first buffer.

17 Claims, 8 Drawing Sheets

FOREIGN PATENT DOCUMENTS

| | | |
|---|---|---|
| JP | 2006067452 A | 3/2006 |
| JP | 2006246361 A | 9/2006 |
| JP | 2007221214 A | 8/2007 |
| WO | 2007052535 A | 5/2007 |

* cited by examiner

IMAGING DEVICE, IMAGING METHOD, AND PROGRAM INCLUDING AUTOMATICALLY CONTROLLING AN INTERVAL OF CONTINUOUS PHOTOGRAPHING

TECHNICAL FIELD

The present invention relates to an imaging device, an imaging method and a program. Particularly, the present invention relates to an imaging device having a continuous photographing function, an imaging method using the same and a program.

BACKGROUND ART

The following technologies are known with respect to an imaging device having a continuous photographing function. That is, the imaging device stores output data from an imaging element in a buffer memory once, performs a compression process or the like to the data, and stores the data in the buffer memory again. After that, the imaging device writes the data stored in the buffer memory into a removable recording medium or the like. Such technology is disclosed in, for example, Japanese Patent Application Laid-Open No. 2002-199328, Japanese Patent Application Laid-Open No. 2003-87619, and Japanese Patent Application Laid-Open No. HEI03 (1991)-252282.

The imaging device described in the Japanese Patent Application Laid-Open No. 2002-199328 has a first process function to store output data of a photographing element in a first memory area and a second process function to perform a compression process to the data stored in the first memory area and store the data in a second memory area. This imaging device has a recording medium for storing the data stored in the second memory area. This imaging device checks whether a capacity of an empty area in the second memory area is greater than a volume of data after the process in order to prevent the image data after the compression process stored in the second memory area from being overwritten with the newly processed image data. When the empty area has insufficient capacity to store the data after the process, the imaging device stops the writing of data into the second memory area. The imaging device writes the data to be stored in the second memory area into the recording medium to secure the empty area in the second memory area. After that, the imaging device starts the compression process of the image data that is written into the second memory area.

The imaging device which has a RAW buffer area for non-processed image data, a compressed image buffer area for the processed image data, and a recording medium is disclosed in the Japanese Patent Application Laid-Open No. 0.2003-87619. This imaging device checks whether a compressed image buffer is full or not after performing the compression process of the data in the RAW buffer. When the compressed image buffer is full, the imaging device stops the writing into the buffer. The imaging device writes the compressed image data stored in the buffer into the recording medium from the oldest data. The imaging device resumes the compression process or the like that has been interrupted when the capacity of the empty area is secured in the compressed image buffer.

A camera is disclosed in Japanese Patent Application Laid-Open No. 2007-221214 which operates as follows. A control circuit of this camera writes a photographed digital image to which no process has been performed into a buffer memory and simultaneously performs a process to the digital image. The control circuit reads out the processed digital image from the buffer memory and writes it into a permanent memory. The control circuit determines a processing time of the non-processed image in the buffer memory that are continuously photographed and calculates a continuous photographing speed at which the continuous photographing can be performed at a constant interval in advance. When the control circuit detects that the amount of the image data will reach the almost maximum storage capacity of the buffer memory which stores the non-processed image, it switches the photographing speed to the calculated photographing speed at which the continuous photographing can be performed at a constant interval.

DISCLOSURE OF THE INVENTION

Problems to be Solved by the Invention

The camera described in the Japanese Patent Application Laid-Open No. 2002-199328 and the Japanese Patent Application Laid-Open No. 2003-87619 continuously performs a continuous photographing until the empty area of the buffer memory in which the processed, such as compression, data is stored will be completely used and writes the processed data into the buffer memory. When the empty area is completely used, the camera stops the writing to the buffer memory. The camera writes the processed data into a recording medium from the buffer memory to create the empty area in the buffer memory. After that, the camera resumes the photography process.

The camera described in the Japanese Patent Application Laid-Open No. 2007-221214 calculates the low continuous photographing speed in advance based on the processing time for the non-processed image in the buffer memory that are continuously photographed. After the empty area of the buffer memory has been almost used, the camera discontinuously changes the continuous photographing speed to perform the continuous photographing at a constant speed (temporally equal interval).

In the camera described in the Japanese Patent Application Laid-Open No. 2002-199328 and the Japanese Patent Application Laid-Open No. 2003-87619, the continuous photographing speed is improved while the buffer memory has the empty area. However, when the empty area has been completely used, the continuous photographing and the processing immediately stop. Accordingly, a problem occurs in which a stable continuous photographing operation cannot be realized, for example, the continuous photographing operation irregularly stops or the like in a case in which a writing speed of a recording medium side cannot be expected or it cannot be guaranteed that the writing speed is more than a predetermined speed.

In the camera described in the Japanese Patent Application Laid-Open No. 2007-221214, when the buffer memory will be almost filled with the image data, the continuous photographing speed is changed to a low speed suddenly. Accordingly, a problem in which the stable continuous photographing operation cannot be realized occurs.

An object of the present invention is to provide an imaging device that can solve the above-mentioned problem, an imaging method and a program.

Means for Solving the Problems

A first imaging device of the present invention includes imaging means for generating image data, a first buffer for storing the image data, and control means for controlling an interval of photographing by the imaging means to maintain a constant or according to a continuous function which decreases monotonically with respect to a remaining capacity of the first buffer.

A first imaging method of the present invention includes generating image data, storing the image data into a first buffer, and controlling a photographing interval at which the image data is generated to maintain a constant or according to a continuous function which decreases monotonically with respect to a remaining capacity of the first buffer.

A storage medium storing an imaging program for causing a computer to execute: a process for generating image data, a process for storing the image data into a first buffer, and a process for controlling a photographing interval at which the image data is generated to maintain a constant or according to a continuous function which decreases monotonically with respect to a remaining capacity of the first buffer.

Effect of the Invention

By using the present invention, an effect in which a stable and continuous photographing operation can be realized in the imaging device is obtained.

Figure 1:
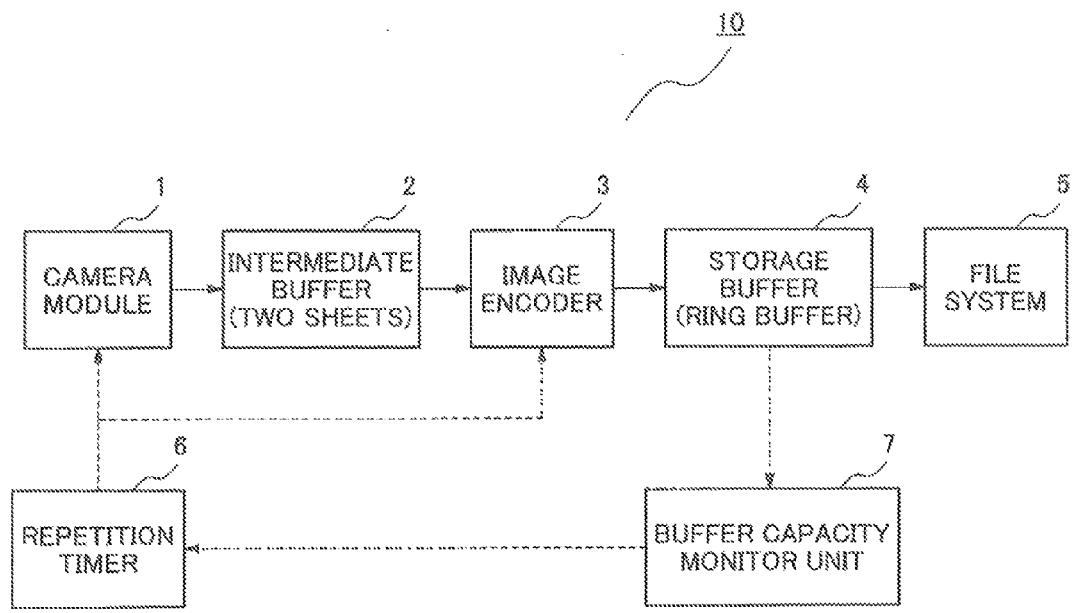
FIG. 1 is a block diagram showing a configuration of an imaging device according to an exemplary embodiment 1 of the present invention.

DESCRIPTION OF SYMBOL 1, 32 camera module
2, 22 intermediate buffer
3, 23 image encoder
4, 24, 31 storage buffer
5, 25 file system
6 repetition timer
7 buffer capacity monitor unit
10, 20, 30 imaging device
26 control unit (CPU)
27 operation unit
28 control means
32 control means

BEST MODE FOR CARRYING OUT THE INVENTION

Exemplary Embodiment 1

FIG. 1 is a block diagram showing a configuration of an imaging device 10 according to an exemplary embodiment 1 of the present invention. As shown in FIG. 1, the imaging device 10 includes a camera module 1, an intermediate buffer (a second buffer) 2, an image encoder 3, a storage buffer (a first buffer) 4, a file system 5, a repetition timer 6 and a buffer capacity monitor unit 7. A function of each unit is shown below.

The camera module 1 photographs an image of an object as a still image and generates image data (digital data). When the continuous photographing is performed, the camera module 1 starts each photographing operation in response to an instruction from the repetition timer 6.

The intermediate buffer 2 is a memory in which the image data generated by the camera module 1 is temporarily stored. The intermediate buffer 2 has two sheets of memory. The continuous image data can be alternately stored in the two sheets of memory.

The image encoder 3 encodes the image data stored in the intermediate buffer 2 by a predetermined codec and outputs it as a compressed stream. JPEG (Joint Photographic Experts Group) or the like can be used as a coding system of the codec. The image encoder 3 also starts each encode operation in response to the instruction from the repetition timer 6.

The storage buffer 4 stores the compressed stream of the image data outputted from the image encoder 3. The storage buffer 4 stores the data in a First-In, First-Out (FIFO) manner. Usually, the size of the compressed stream is not constant. Therefore, it is desirable that a ring buffer is installed in the storage buffer 4.

The file system 5 stores the compressed stream stored in the storage buffer 4 into an external storage device or the like in order as a file. When the compressed stream is stored in the storage buffer 4, the file system 5 starts the operation.

The repetition timer 6 generates a processing timing with a predetermined interval (continuous photographing interval) for the camera module 1 and the image encoder 3 by counting the number of clocks or the like till a set timeout value. Here, the timeout value means the continuous photographing interval at which the camera module 1 performs the continuous photographing. The repetition timer 6 outputs an instruction signal which instructs the camera module 1 and the image encoder 3 to start each process at the interval corresponding to the timeout value.

The buffer capacity monitor unit 7 monitors the data volume of the compressed stream stored in the storage buffer 4 and generates the timeout value that uniquely determines an output timing of a signal generated by the repetition timer 6 according to a remaining capacity of the storage buffer 4 that is the remaining buffer capacity. The buffer capacity monitor unit 7 holds a threshold value respect to the remaining buffer capacity in advance. The buffer capacity monitor unit 7 always monitors the data volume of the storage buffer 4 and compares the remaining buffer capacity of the storage buffer 4 with the threshold value. As a result of the comparison, when the remaining buffer capacity is less than the threshold value, the buffer capacity monitor unit 7 sets a timeout value to the repetition timer 6, the timeout value is increased according to the decrease of the remaining buffer capacity.

The buffer capacity monitor unit 7 holds a maximum data volume, that is, a maximum code amount of the compressed stream of one frame of image in advance. The buffer capacity monitor unit 7 compares the remaining buffer capacity of the storage buffer 4 with the maximum code amount. As a result of the comparison, when the remaining buffer capacity is less than the maximum code amount, the buffer capacity monitor unit 7 stops a timer operation of the repetition timer 6 (the timeout value is infinite). When the remaining buffer capacity is equal to or greater than the maximum code amount, the buffer capacity monitor unit 7 supplies the timeout value which corresponds to the maximum code amount to the repetition timer 6 and performs a control so as to resume the timer operation of the repetition timer 6. Further, the repetition timer 6 and the buffer capacity monitor unit 7 realize a main control function of the present invention with which all the units from the camera module 1 to the file system 5 are controlled.

Figure 2:
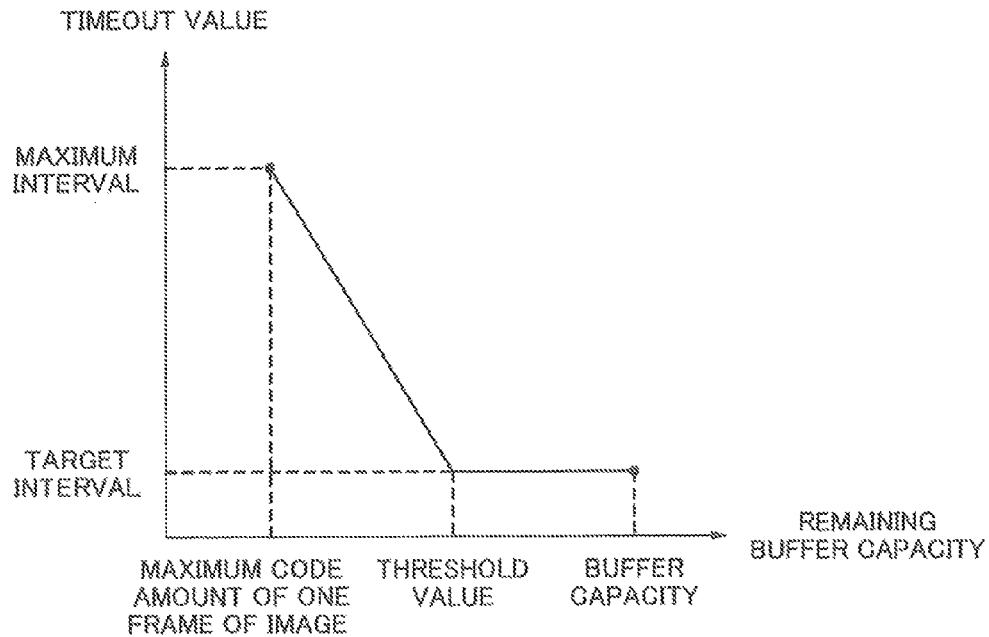
FIG. 2 is a graph showing an operation of a buffer capacity monitor unit of an imaging device according to an exemplary embodiment 1.

FIG. 2 is a graph showing the control operation of the buffer capacity monitor unit 7 of the exemplary embodiment. In the graph shown in FIG. 2, the horizontal axis represents remaining buffer capacities at each time and the vertical axis represents timeout values which is determined according to the remaining buffer capacity.

The lower limit of the timeout value is a target interval which is set by a user, that is, a continuous photographing interval at the highest speed. The upper limit of the timeout value is a predetermined maximum interval, that is, the continuous photographing interval at the lowest speed. The maximum value of the remaining buffer capacity is the buffer capacity.

The buffer capacity monitor unit 7 holds an arbitrary threshold value respect to the remaining buffer capacity in advance. This threshold value is less than the buffer capacity and greater than the maximum code amount of one frame of image. As shown in FIG. 2, the buffer capacity monitor unit 7 sets the timeout value to a constant value that is the target interval during a time period in which the remaining buffer capacity is equal to or greater than the threshold value. On the other hand, the buffer capacity monitor unit 7 sets the timeout value to a value that is greater than the target interval during a time period in which the remaining buffer capacity is less than the threshold value. In other words, the timeout value has a control characteristic for the continuous photographing interval in which the timeout value continuously increases with the decrease of the remaining buffer capacity.

When the remaining buffer capacity of the storage buffer 4 is equal to or greater than the threshold value, it is supposed that the writing speed by the file system 5 is sufficiently faster than the data storage speed to the storage buffer 4. Accordingly, it is not necessary to reduce the continuous photographing speed. Therefore, the buffer capacity monitor unit 7 sets the timeout value so as to maintain the target interval.

On the other hand, when the remaining buffer capacity of the storage buffer 4 becomes less than the threshold value, it is supposed that the writing speed of the file system 5 is slower than the data storage speed to the storage buffer 4. Therefore, the buffer capacity monitor unit 7 increases the continuous photographing interval gradually with the decrease of the remaining buffer capacity.

Additionally, when the remaining buffer capacity becomes less than the maximum code amount of one frame of image, the buffer will be completely used if one frame of image is further added. Therefore, in this case, the buffer capacity monitor unit 7 stops the operation of the repetition timer 6.

Next, an operation of the imaging device of this exemplary embodiment will be described.

First, the continuous photographing operation by the imaging device 10 in a case in which the storage buffer 4 has a sufficient remaining capacity will be described.

Figure 3:
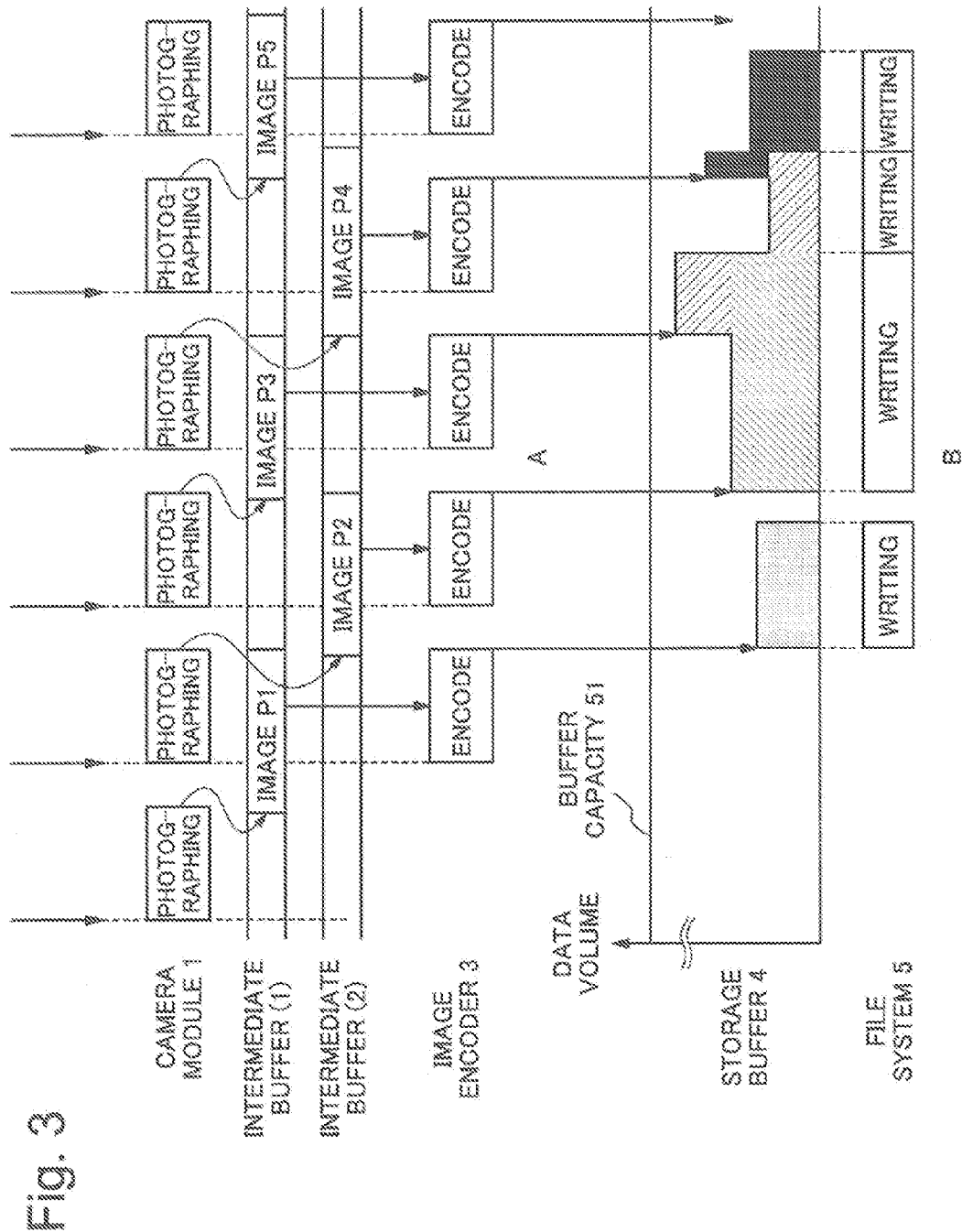
FIG. 3A and FIG. 3B are time charts showing a basic operation of an imaging device according to an exemplary embodiment 1.

FIG. 3 is a time chart showing a basic operation of this exemplary embodiment. The continuous photographing operation will be described with reference to the FIG. 1, FIG. 3A and FIG. 3B.

FIG. 3A shows each timing of the photography instruction of the repetition timer 6 and operations from the photographing operation of the camera module 1 to an encode operation of the image encoder 3.

The repetition timer 6 supplies a signal with which the camera module 1 is instructed to start a photographing at a constant interval, that is, the target interval and supplies a signal with which the image encoder 3 is instructed to start a coding process. The camera module 1 and the image encoder 3 start the operation simultaneously in response to these signals. The camera module 1 photographs a still image and generates image data. The camera module 1 writes the image data into one buffer having an empty area among an intermediate buffer (1) and an intermediate buffer (2) included in the intermediate buffer 2. At that time, the image encoder 3 reads out the image data stored in the other intermediate buffer 2 and encodes it. Both start the operation simultaneously. Therefore, the image encoder 3 certainly encodes the image data that has photographed before last photographing.

Thus, the imaging device 10 performs the photography process in parallel with the encode process. Namely, a pipeline process is performed between both processes. According to the operation, the imaging device 10 can shorten the continuous photographing interval to either longer one of a time required for photographing or a time required for encoding, the continuous photographing interval usually can not be reduced less than or equal to a sum of both of the time.

The image encoder 3 stores the encoded image data, that is, the compressed stream in the storage buffer 4. FIG. 3B shows an operation in which the compressed stream generated by the image encoder 3 is written into the storage buffer 4 and the file system 5.

The image encoder 3 writes the generated compressed stream into the storage buffer 4. Even if one sheet of compressed stream is stored in the storage buffer 4, the file system 5 starts an operation to store it into the external storage device as the file. While the compressed stream remains in the storage buffer 4, the file system 5 operates continuously. Further, during the photographing operation, the buffer capacity monitor unit 7 always monitors the remaining buffer capacity of the storage buffer 4 and controls the timeout value toward the repetition timer 6.

In the graph about the storage buffer 4 shown in FIG. 3B, the vertical axis represents the data volume. A solid line 51 shows the buffer capacity of the storage buffer 4. FIG. 3B shows operations after the generated compressed stream is stored in the storage buffer 4 until it is written into the file system 5 and then deleted from the storage buffer 4.

In an example shown in FIG. 3B, the stored amount of the compressed stream is sufficiently less than the buffer capacity of the storage buffer 4. Therefore, the buffer capacity monitor unit 7 supplies the instruction signal having the constant interval, that is, the target interval to the repetition timer 6 as the timeout value without changing the timeout value. The camera module 1 performs the continuous photographing operation at this target interval.

Next, an operation with which the control characteristic shown in FIG. 2 of this exemplary embodiment is realized will be described.

Figure 4:
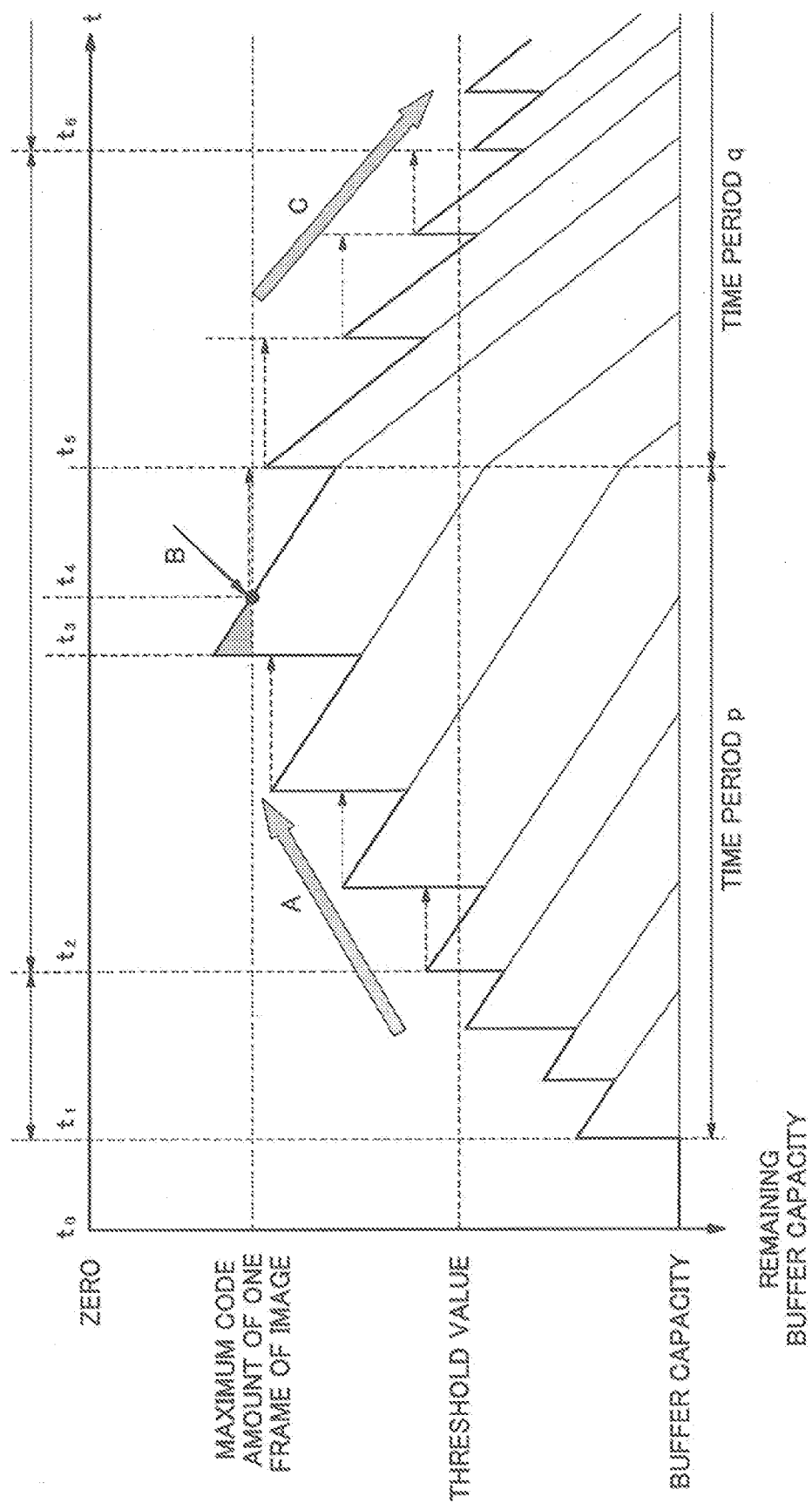
FIG. 4 is a time chart illustrating a photographing interval of continuous photographing performed by an imaging device according to an exemplary embodiment 1.

FIG. 4 is a time chart showing an operation in a case in which the continuous photographing speed is changed. FIG.

4 illustrates the remaining buffer capacity of the storage buffer 4 and the operation of the buffer capacity monitor unit 7.

In FIG. 4, the vertical axis represents the remaining buffer capacity and the horizontal axis represents time. FIG. 4 shows a state in which the compressed stream is written into the storage buffer 4 and a state in which the compressed stream stored in the storage buffer 4 is written into the file system 5 after a time t1. FIG. 4 also shows the transition of the remaining buffer capacity which represents a state in which the compressed stream written from the storage buffer 4 is deleted.

Further, FIG. 4 shows the saw-like transition of remaining buffer capacity that indicates a state in which the compressed stream stored in the storage buffer 4 decreases just after the compressed stream has been written in the storage buffer 4. When the deletion operation of the storage buffer 4 with respect to the compressed stream which has already been written into the file system 5 is performed for each completion of writing of one frame of image, the remaining buffer capacity shows stair-like transition as well as FIG. 3.

In an example shown in FIG. 4, it is assumed that the speed of the writing operation of the file system 5 is not constant and changes in the vicinity of a time t5. Namely, it is assumed that the speed of the writing operation of the file system 5 is low during a time period p and high during a time period q. The speed of the writing operation is shown by a right downward slope (and a slope of a thin line).

Figure 5:
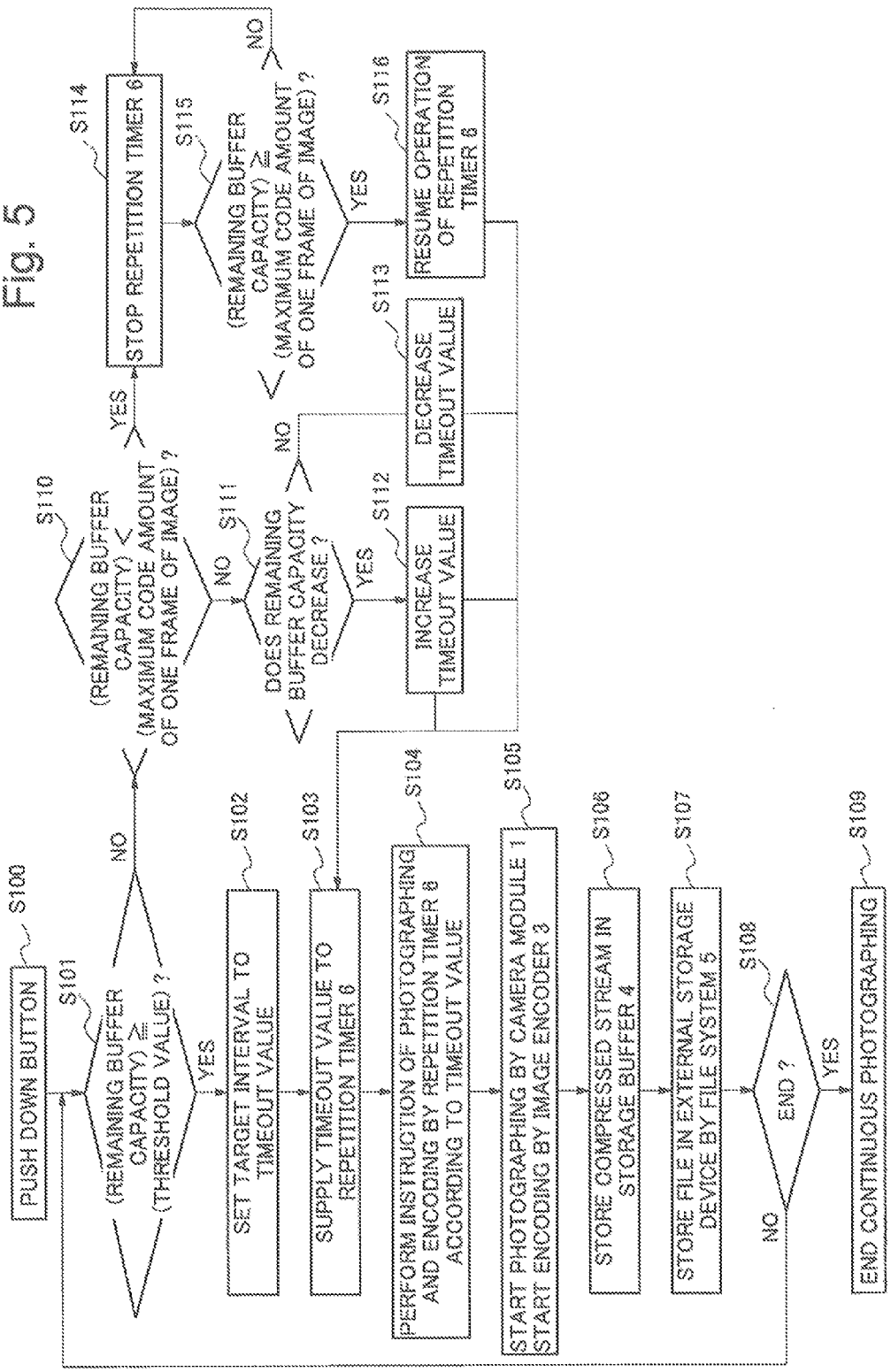
FIG. 5 is a flowchart showing an operation of an imaging device according to an exemplary embodiment 1.

FIG. 5 is a flowchart showing an operation of the imaging device 1 according to this exemplary embodiment. The operation of the imaging device 1 will be described with reference to FIG. 4 and FIG. 5.

A case in which a user pushes down a continuous photographing button of the camera module 1 at the time t1 at which the remaining buffer capacity of the storage buffer 4 is maximum (time t0 to t1) will be described (Step S100).

The buffer capacity monitor unit 7 determines whether the remaining buffer capacity is equal to or greater than the threshold value in response to the pushing down (Step S101). Here, because the remaining buffer capacity is equal to or greater than the threshold value, the buffer capacity monitor unit 7 sets the continuous photographing interval at the highest speed, that is, the target interval for the timeout value (Step S102) and supplies it to the repetition timer 6 (Step S103).

The repetition timer 6 supplies an instruction signal for photographing and an instruction signal for encoding to the camera module 1 and the image encoder 3 at the target interval, respectively (Step S104). In response to the above-mentioned signal, the camera module 1 starts an operation of a high speed continuous photographing and stores the generated image data in the intermediate buffer 2 (Step S105). In response to the above-mentioned signal, the image encoder 3 encodes the image data stored in the intermediate buffer 2 and outputs it as the compressed stream (Step S105). The outputted compressed stream is stored into the storage buffer 4 (Step S106). When the compressed stream is stored into the storage buffer 4, the file system 5 reads it out and stores it into the external storage device (Step S107). When the continuous photographing end instruction is issued by a user (Step S108), the camera module 1 ends the continuous photographing operation (Step S109). If the continuous photographing end instruction is not issued, a process returns to the step S101. In an example shown in FIG. 4, the camera module 1 performs the continuous photographing at the target interval, that is, an original speed from the time t1 to the time t2.

Here, the writing speed by the file system 5 is low. Therefore, the stored amount of the compressed stream in the storage buffer 4 gradually increases and the remaining buffer capacity gradually decreases. The remaining buffer capacity is less than the threshold value at the time t2.

The buffer capacity monitor unit 7 monitors the remaining buffer capacity based on the threshold value. When the buffer capacity monitor unit 7 detects that the remaining buffer capacity is less than the threshold value in the step S101, it checks whether the remaining buffer capacity is less than the maximum code amount of one frame of image (Step S110). Here, the remaining buffer capacity is equal to or greater than the maximum code amount of one frame of image. As mentioned above, the remaining buffer capacity decreases (Step S111). Therefore, the buffer capacity monitor unit 7 increases the timeout value according to the remaining buffer capacity or the like at that time (Step S112) and supplies the increased timeout value to the repetition timer 6 (Step S103). The buffer capacity monitor unit 7 may determine the increase amount according to the control characteristic shown in FIG. 2. The repetition timer 6 supplies the instruction signal for photographing to the camera module 1 and supplies the instruction signal for the coding process to the image encoder 3 according to the increased timeout value (Step S104). In response to the above-mentioned signal, the camera module 1 continues the continuous photographing operation.

In an example shown in FIG. 4, the remaining buffer capacity also decreases after the time t2. During this time period, the buffer capacity monitor unit 7 sequentially increases the timeout value according to the remaining buffer capacity at each time and supplies the increased timeout value to the repetition timer 6. The repetition timer 6 supplies the instruction signal for photographing to the camera module 1 according to the increased timeout value. The camera module 1 continues the continuous photographing operation in response to the above-mentioned signal. The continuous photographing speed will continuously decrease. During a time period indicated by an arrow A, the photographing interval becomes large with the decrease of the remaining buffer capacity.

Next, at a time t3, the compressed stream is written and whereby the remaining buffer capacity of the storage buffer 4 is less than the maximum code amount of one frame of image. The buffer capacity monitor unit 7 detects that the remaining buffer capacity of the storage buffer 4 is less than the maximum code amount of one frame of image ("Yes" in Step S110) and stops the repetition timer 6 (timeout value is infinite) during a time period in which the remaining buffer capacity of the storage buffer 4 is less than the maximum code amount, that is, a time period from the time t3 to the time t4 (Step S114). After the time t3, the writing of the compressed stream into the storage buffer 4 is stopped and the compressed stream is written into the file system 5 from the storage buffer 4. Accordingly, the remaining buffer capacity of the storage buffer 4 gradually increases. At a point B at the time t4, the maximum code amount is secured as the remaining buffer capacity. The buffer capacity monitor unit 7 detects that the maximum code amount has been secured as the remaining buffer capacity at the time t4 (Step S115) and instructs the repetition timer 6 to resume the operation (Step S116). The timeout value when the operation of the repetition timer 6 is resumed is a value corresponding to the maximum code amount.

The buffer capacity monitor unit 7 successively monitors the remaining buffer capacity after the time t4. The buffer capacity monitor unit 7 sets the timeout value corresponding to the remaining buffer capacity at each time for the repetition timer 6 during a time period in which the remaining buffer capacity of the storage buffer 4 is less than the threshold value that is a time period in which a timeout value is continuously controlled. Thus, the camera module 1 continues the continuous photographing operation according to the timeout value that is changed.

Here, after the time t5 at which the operation of the repetition timer 6 is resumed, during a time period q, the writing operation by the file system 5 is performed at high speed. Therefore, the remaining buffer capacity of the storage buffer 4 gradually increases.

Accordingly, in the step S111, the buffer capacity monitor unit 7 detects that the remaining buffer capacity of the storage buffer 4 increases and decreases the timeout value of the repetition timer 6 (Step S113). As a result, during a time period indicated in an arrow C, the continuous photographing interval gradually decreases and the continuous photographing speed continuously increases. The remaining buffer capacity is less than the threshold value during a time period from the time t1 to the time t6. Therefore, the camera module 1 performs the continuous photographing at the interval greater than the target interval, that is, a speed lower than the highest speed.

The remaining buffer capacity is equal to or greater than the threshold value at the time t6 ("Yes" in Step S101). The buffer capacity monitor unit 7 sets the timeout value of the repetition timer 6 to the target interval. As a result, the camera module 1 returns to an original state in which it performs the high-speed continuous photographing.

By the above-mentioned operation, the buffer capacity monitor unit 7 controls the timeout value.

As mentioned above, in the imaging device 10 according to the exemplary embodiment 1, the buffer capacity monitor unit 7 always monitors the remaining buffer capacity of the storage buffer 4 and controls the photographing interval continuously for at least a part of photographing. Namely, when the remaining buffer capacity is equal to or greater than the threshold value, the buffer capacity monitor unit 7 does not change the timeout value and sets it to the highest speed, that is, the target interval. As the result, the camera module 1 can perform the continuous photographing at the target interval. This can be realized even when the data writing speed into the file system 5 from the storage buffer 4 is so low that it cannot be guaranteed that the data writing speed is equal to or less than the predetermined value or the writing speed cannot be predicted.

When the remaining buffer capacity is less than the threshold value, the buffer capacity monitor unit 7 changes the timeout value according to the decrease or the increase of the remaining buffer capacity. Namely, the buffer capacity monitor unit 7 increases or decreases the continuous photographing interval continuously between the highest speed and the lowest speed. As a result, the camera module 1 can perform the stable and continuous photographing operation.

Moreover, when the remaining buffer capacity of the storage buffer 4 is less than the maximum code amount of one frame of image, the buffer capacity monitor unit 7 stops the timer operation of the repetition timer 6 during this time period. By this, the remaining buffer capacity increases because the storage of the compressed stream in the storage buffer 4 stops. Therefore, after a time at which the remaining buffer capacity is equal to or greater than the maximum code amount of one frame of image, the camera module 1 can perform the continuous photographing operation successively.

Thus, the continuous photographing interval naturally and continuously changes from a high speed to a low speed according to the remaining buffer capacity of the storage buffer 4 and an effect in which a stable and continuous photographing operation can be realized in the imaging device 10 is obtained.

By the above-mentioned control, when the performance of the file system 5 is low, the buffer capacity monitor unit 7 increases the continuous photographing interval. Whereby the writing speed of the file system 5 is balanced with the continuous photographing interval and the continuous photographing operation can be made stable. Even when the writing speed of the file system 5 decreases instantaneously, the buffer capacity monitor unit 7 temporarily makes the continuous photographing interval large according to the speed. When the writing speed is recovered, the continuous photographing interval can be set to an original interval. Therefore, the continuous photographing operation can be made stable similarly.

Thus, a control in which the continuous photographing speed is decreased when the operation speed of the file system is low and the continuous photographing speed is increased when the operation speed of the file system is high can be realized. As the result, the operation speed required for the file system 5 which writes the data stored in the storage buffer 4 into the external storage device or the like, the external storage device, or the like can be reduced.

Here, in recent years, maximum size of a photograph which can be taken constantly increases with the increase in function of an imaging device. As the result, a photographing speed, an encode speed, and the writing speed to the file decrease. For this reason, in order to realize an imaging device with the continuous photographing function, it has been necessary to mount a memory with extremely large capacity or configure each unit of the imaging device by using a component that can operate at high speed. These components are expensive. Therefore, there was a large problem in realizing an imaging device. In the imaging device 10 according to this exemplary embodiment, a file system process whose processing time is not generally stable is separated from an image process and the photographing interval is variably and continuously controlled according to the remaining capacity of the storage buffer 4 provided between them. By this configuration, the high speed, stable, and continuous photographing can be realized without using an expensive component in the imaging device.

The imaging device 10 has the intermediate buffer 4 including two sheets of memory and stores the continuous image data alternately. By using this intermediate buffer 4, the camera module 1 and the image encoder 3 can simultaneously start an imaging process and a coding process, respectively. According to this configuration, the imaging device 10 can shorten the continuous photographing interval to either longer one of a time required for photographing or a time required for encoding, the continuous photographing interval usually can not be reduced less than or equal to a sum of both of the time. Accordingly, in addition to the above mentioned control of the timeout value by the buffer capacity monitor unit 7, the pipeline process is performed between the photography process and the encode process in the imaging device 10. Whereby, the imaging device 10 can perform the stable and continuous photographing operation at a short continuous photographing interval even when the performance of the component configuring each is low.

Moreover, the imaging device 10 has a configuration in which the storage buffer 4 stores the compressed stream. Therefore, the imaging device 10 can use a memory with small capacity as a memory for the buffer in comparison with a case in which the storage buffer 4 holds the non-compressed image data.

Exemplary Embodiment 2

Each function block and each processing operation shown in the above-mentioned exemplary embodiment 1 can be configured by hardware as mentioned above and can be realized by computer control using a CPU (Central Processing Unit), a ROM (Read Only Memory), a RAM (Random Access Memory), and the like.

Figure 6:
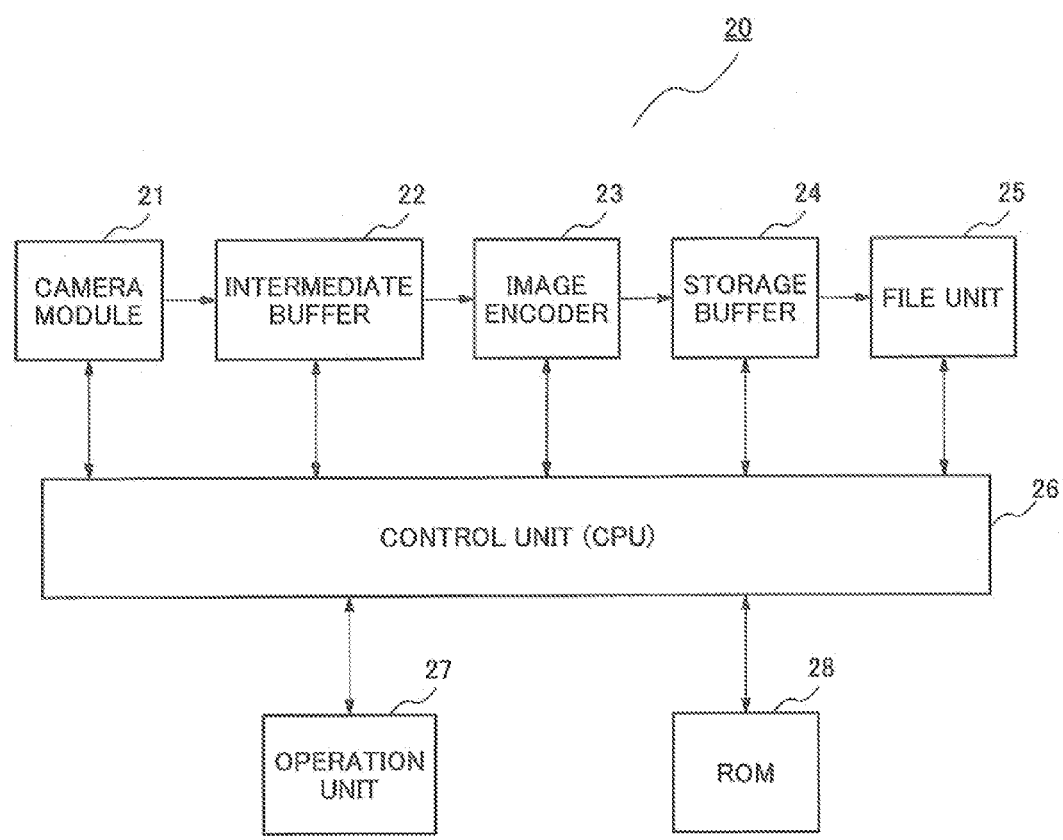
FIG. 6 is a block diagram showing a configuration of an imaging device according to an exemplary embodiment 2 of the present invention.

FIG. 6 is a block diagram showing a configuration of an imaging device 20 that is controlled by the computer. The imaging device 20 includes a camera module 21, an intermediate buffer 22, an image encoder 23, a storage buffer 24, a file system 25, a control unit (CPU) 26, an operation unit 27, and a ROM 28. The camera module 21 has the continuous photographing function. The intermediate buffer 22 and the storage buffer 24 can be configured by the storage area of the RAM or the like. The image encoder 23 compresses the image data. The file system 25 writes the compressed stream into the external storage device or the like as a file. The control unit (CPU) 26 controls each unit. The operation unit 27 receives a photographing operation or the like by a user. The ROM 28 stores a control program or the like.

In this exemplary embodiment, the control unit (CPU) 26 reads out the control program stored in the ROM 28, the control unit (CPU) 26 is controlled based on the read program and controls each unit. The control unit (CPU) 26 realizes each control function described in relation to the buffer capacity monitor unit 7 and the repetition timer 6 of the exemplary embodiment 1 shown in FIG. 1 and the control characteristic shown in the graph of FIG. 2 according to the program.

Next, a processing procedure of the imaging device 20 according to this exemplary embodiment will be described.

Figure 7:
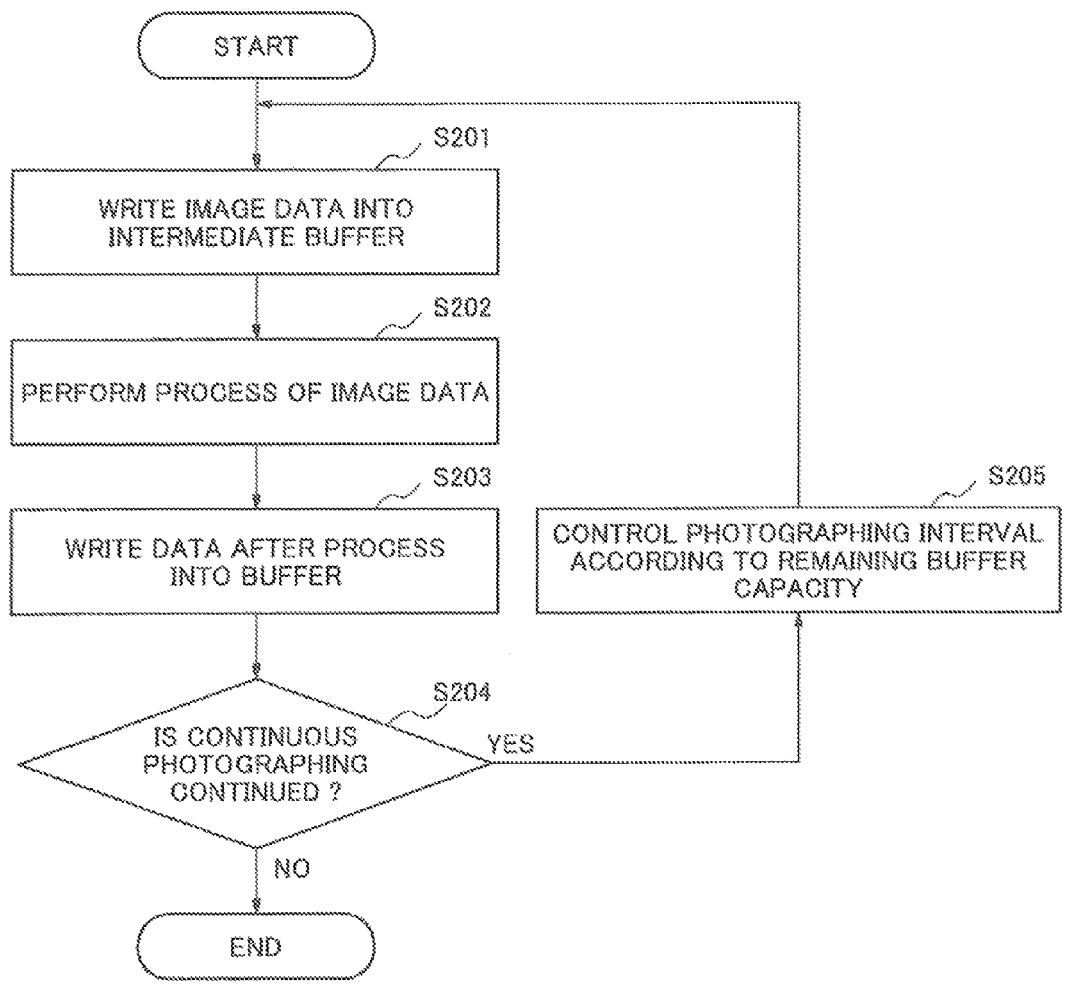
FIG. 7 is a flowchart showing a data writing operation in a storage buffer of an imaging device according to an exemplary embodiment 2.

FIG. 7 is a flowchart showing the data writing operation to the storage buffer 24. The control unit (CPU) 26 performs a control in which the image data obtained by the continuous photographing of the camera module 21 is written into the intermediate buffer 22 once (Step S201). The control unit (CPU) 26 performs a control in which the most recently written image data is read out and allows the image encoder 23 to encode the data (Step. S202). The control unit (CPU) 26 performs a control in which the encoded image data is written into the storage buffer 24 (Step S203). Next, the control unit (CPU) 26 determines whether the photographing operation by the camera module 21 is the continuation of the continuous photographing (Step S204). When it is determined that the photographing operation is the continuation of the continuous photographing, the control unit (CPU) 26 monitors the remaining buffer capacity by the storage of the image data of the storage buffer 24 and controls the photographing interval continuously for at least a part of the photographing according to the remaining buffer capacity based on the graph shown in FIG. 2 (Step S205).

Figure 8:
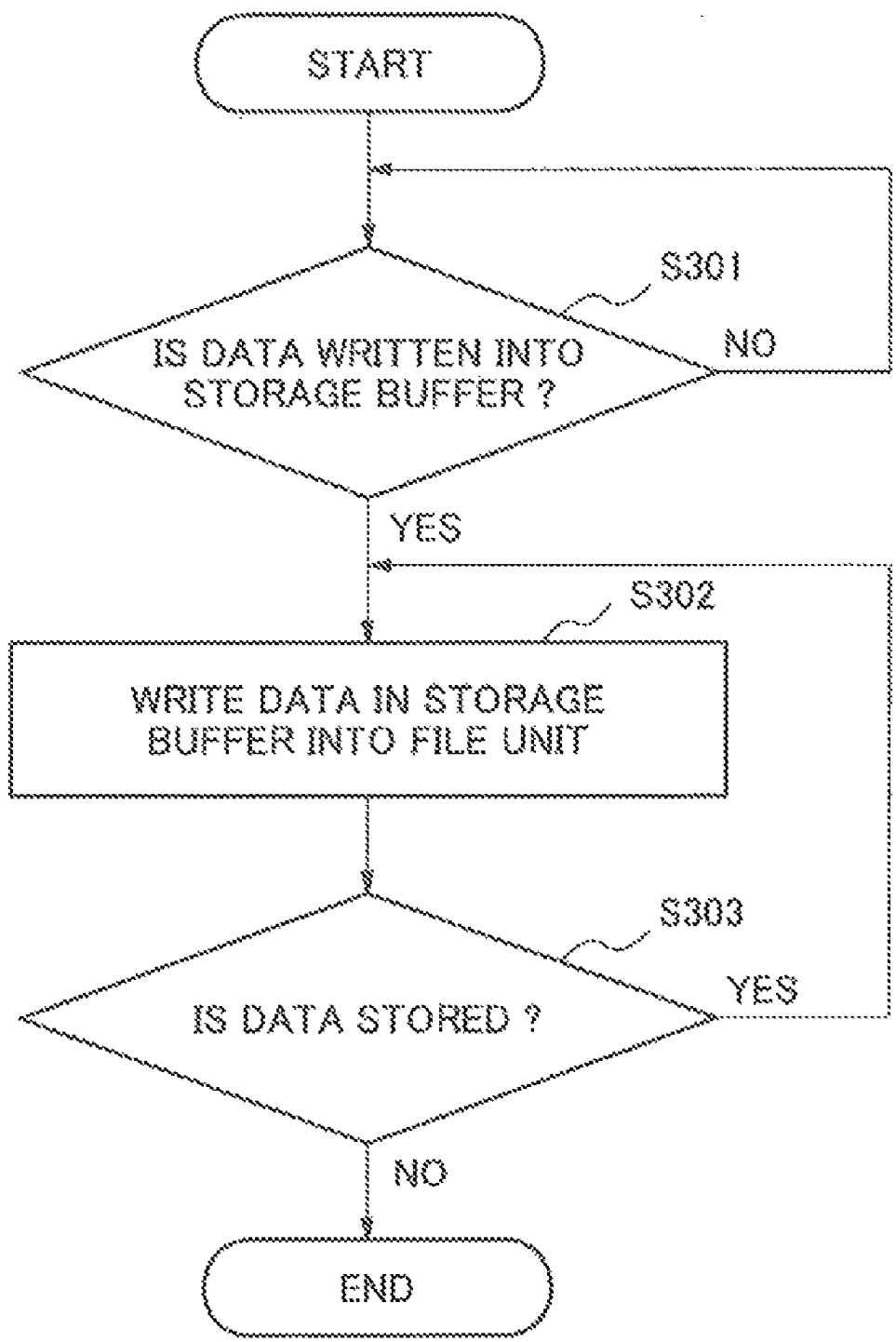
FIG. 8 is a flowchart showing a writing operation to a file system of an imaging device according to an exemplary embodiment 2.

FIG. 8 is a flowchart showing the writing operation by the file system 25. When the image data after the image process is written into the storage buffer 24 (Step S301), the control unit (CPU) 26 writes the image data into the file system 25 in unit of the image data (Step S302). Next, it is determined whether or not the image data is stored in the storage buffer 24 (Step S303). When it is determined that the image data is stored in it, a process returns to the step S301 and the writing to the file system 25 is repeated. The speed of the writing operation depends on a characteristic or the like of the file system 25 and the external storage device used by the file system 25.

As mentioned above, in the imaging device 20 according to the exemplary embodiment 2, the image processing unit including the intermediate buffer 22 and the image encoder 23 is separated from the file system 25 like the imaging device 10 according to the above-mentioned exemplary embodiment 1. The control unit (CPU) 26 continuously controls the photographing interval according to the remaining buffer capacity of the storage buffer 24 provided between them. By this configuration, the imaging device 20 can realize the stable and continuous photographing operation even when the writing speed is so low that it cannot be guaranteed that the writing speed of the file system 25 is equal to or greater than the predetermined value or the writing speed cannot be predicted.

Exemplary Embodiment 3

Figure 9:
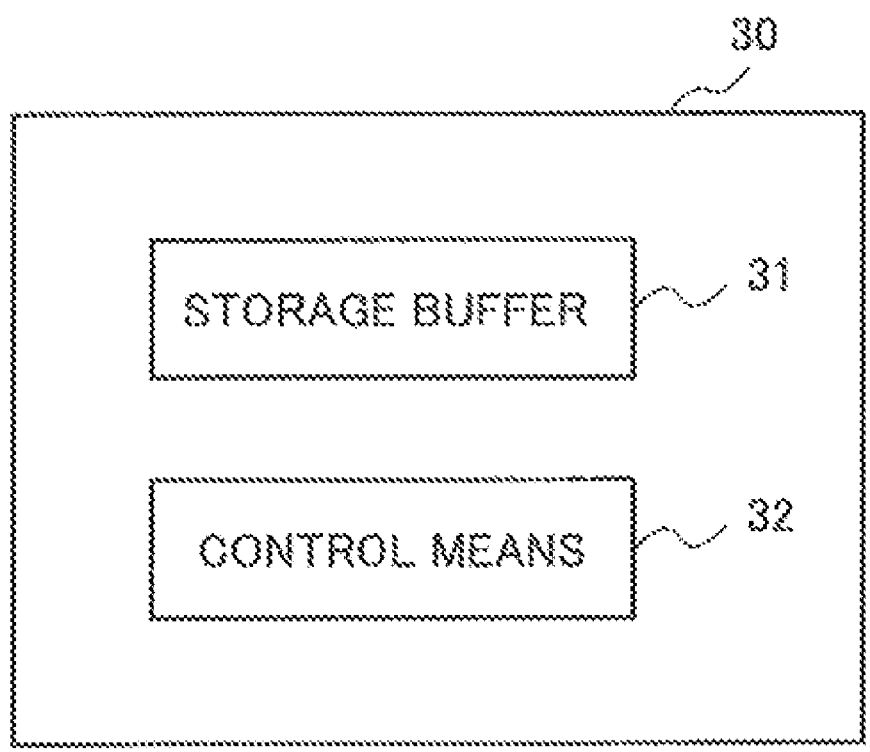
FIG. 9 is a block diagram showing a configuration of an imaging device according to an exemplary embodiment 3 of the present invention.

FIG. 9 is a block diagram showing a configuration of an imaging device 30 according to an exemplary embodiment 3 of the present invention. As shown in FIG. 9, the imaging device 30 according to the exemplary embodiment 3 includes a storage buffer 31 and control means 32.

The storage buffer 31 stores data. The control means 32 controls the photographing interval continuously for at least a part of the photographing according to the remaining capacity of the storage buffer 31.

By this configuration, an effect in which a stable and continuous photographing operation can be realized in the imaging device 30 is obtained.

In each exemplary embodiment mentioned above, the exemplary configuration in which a buffer for storing the image data to which the imaging process has been performed is used as a target buffer with which the remaining buffer capacity is monitored in order to control the continuous photographing interval has been shown. However, a configuration is not limited to this configuration. Namely, as the other exemplary embodiments of the present invention, a configuration may be used in which a buffer for storing the non-processed image data to which the compression process has not been performed is used as the target buffer.

In this case, the configuration is changed into a configuration in which the intermediate buffer 2 of the exemplary embodiment shown in FIG. 1 is used as the storage buffer in which the desired number of image data outputted by the camera module 1 can be stored and the remaining buffer capacity of the storage buffer is monitored by the buffer capacity monitor unit 7. Further, a configuration in which the file system 5 writes the output of the storage buffer into the image encoder 3 and writes the image data after the image process into the external storage device or the like if necessary via the storage buffer 4 is used.

In this exemplary embodiment, by performing a control operation of the continuous photographing interval according to a procedure that is similar to that of the operation described in the exemplary embodiment shown in FIG. 1, a control with which the continuous photographing interval is continuously changed as shown in the graph of FIG. 2 can be performed.

Further, the imaging device according to each exemplary embodiment mentioned above holds an arbitrary threshold value between a maximum value of the remaining buffer capacity, that is, the buffer capacity and the maximum code amount of one frame of image as shown in the graph of FIG. 2. It is assumed that the buffer capacity monitor unit 7 controls the continuous photographing interval so that the continuous photographing interval continuously increases with the decrease of the remaining buffer capacity during a time period in which the remaining buffer capacity is between the threshold value and the maximum code amount of one frame of image. However, the operation is not limited to this. Namely, the graph shown in FIG. 2 is an example and the relation between the remaining buffer capacity and the timeout value of the present invention may be different from that shown in FIG. 2. For example, the threshold value shown in the graph of FIG. 2 may be arranged to be close to the buffer capacity as much as possible. The timeout value may be constant when the remaining buffer capacity is between the buffer capacity and the threshold value. The timeout value may be slightly increased between them. A characteristic of which the continuous photographing interval continuously increases with the decrease of the remaining buffer capacity may be set to an arbitrary characteristic having a desired curve.

The present invention has been described with reference to the exemplary embodiments. However, the present invention is not limited to the above-mentioned exemplary embodiments. The various changes in configuration or details of the present invention of which the person skilled in the art can understand in the scope of the present invention can be made.

INDUSTRIAL APPLICABILITY

In the present invention, the photographing interval is controlled according to the remaining capacity of data stored in the buffer provided in a preceding stage of a file system. The present invention can be applied to a file system in which a writing speed is low, a writing speed cannot be predicted, or the like. Accordingly, the present invention can be applied to a camera, a mobile terminal with a camera, and various electronic devices having a camera function.

This application is the National Phase of PCT/JP2009/053110, filed Feb. 16, 2009, which claims priority based on the Japanese application Japanese Patent Application No. 2008-039416 filed on Feb. 20, 2008 and the disclosure of which is hereby incorporated by reference in its entirety.

What is claimed is:

1. An imaging device, comprising:
imaging means for generating image data;
a first buffer for storing the image data; and
control means for automatically controlling an interval of continuous photographing by the imaging means to automatically select between maintaining a constant value of the interval of the continuous photographing and changing a value of the interval of the continuous photographing according to a continuous function,
wherein the changing of the value of the interval according to the continuous function automatically decreases the interval monotonically with respect to a remaining capacity of the first buffer.

2. The imaging device according to claim 1, wherein the control means controls the continuous photographing interval to increase the continuous photographing interval with the decrease of the remaining capacity during a time period in which the remaining capacity is less than a threshold value.

3. The imaging device according to claim 1, wherein the control means controls the continuous photographing interval to be infinite during a time period in which the remaining capacity is less than a maximum data amount of one frame of image and the continuous photographing interval to be set to a value corresponding to the maximum data amount when the remaining capacity becomes equal to or greater than the maximum data amount of one frame of image.

4. The imaging device according to claim 1, further comprising:
a plurality of second buffers for alternately storing the image data generated by the imaging means in order; and
image processing means for reading out the image data in the order in which the plurality of second buffers stores the image data, coding the image data and storing the coded image data into the first buffer.

5. The imaging device according to claim 4, wherein the control means controls a process by the imaging means and a process by the image processing means to start simultaneously.

6. The imaging device according to claim 1, wherein the continuous photographing comprises capturing a plurality of still images, and
wherein the control means automatically controls an interval of continuous photographing of still images according to the remaining capacity of the first buffer.

7. The imaging device according to claim 1, wherein the control means automatically changing a value of the interval of the continuous photographing according to a continuous function until reaching a target value of the interval of the continuous photographing in accordance with the remaining capacity of the first buffer, and
wherein the control means maintains the target value of the interval of the continuous photographing when the remaining capacity of the first buffer reaches a predetermined limit.

8. An imaging method, comprising:
generating image data;
storing the image data into a first buffer; and
controlling automatically a continuous photographing interval at which the image data is generated to automatically select between maintaining a constant value of the interval of the continuous photographing and changing a value of the interval of the continuous photographing according to a continuous function,
wherein the changing of the value of the interval according to the continuous function automatically decreases the interval monotonically with respect to a remaining capacity of the first buffer.

9. The imaging method according to claim 8, wherein during a time period in which the remaining capacity is less than a threshold value, the continuous photographing interval is controlled to increase with the decrease of the remaining capacity.

10. The imaging method according to claim 8, wherein during a time period in which the remaining capacity is less than a maximum data amount of one frame of image, the continuous photographing interval is controlled to be infinite and, when the remaining capacity becomes equal to or greater than the maximum data amount of one frame of image, the continuous photographing interval is controlled to be set to a value corresponding to the maximum data amount.

11. The imaging method according to claim 8, further comprising:
alternately storing the generated image data into a plurality of second buffers in order;
reading out the image data in the order in which the plurality of second buffers stores the image data; and
coding the image data; and storing the coded image data into the first buffer.

12. The imaging method according to claim 11, wherein generating the image data, and reading out the image data in the order in which the plurality of second buffers stores the image data, coding the image data and storing the coded image data in the first buffer are controlled to start simultaneously.

13. A non-transitory storage medium storing a computer program for causing a computer to execute a method, the method comprising:

a process for generating image data;

a process for storing the image data into a first buffer; and a process for automatically controlling a continuous photographing interval at which the image data is generated to automatically select between maintaining a constant value of the interval of the continuous photographing and changing a value of the interval of the continuous photographing according to a continuous function, wherein the changing of the value of the interval according to the continuous function automatically decreases the interval monotonically with respect to a remaining capacity of the first buffer.

14. The non-transitory storage medium storing the computer program according to claim 13, the method further comprising a process for, during a time period in which the remaining capacity is less than a threshold value, being controlled the continuous photographing interval to increases with the decrease of the remaining capacity.

15. The non-transitory storage medium storing the computer program according to claim 13, the method further comprising a process for, during a time period in which the remaining capacity is less than a maximum data amount of one frame of image, being controlled the continuous photographing interval to be infinite and, when the remaining capacity is equal to or greater than the maximum data amount of one frame of image, the continuous photographing interval is controlled to be set to a value corresponding to the maximum data amount.

16. The non-transitory storage medium storing the computer program according to claim 13, method further comprising:

a process for alternately storing the generated image data into a plurality of second buffers in order; and a process for reading out the image data in the order in which the plurality of second buffers stores the image data, coding the image data, and storing the coded image data into the first buffer.

17. The non-transitory storage medium storing the computer program according to claim 16, the method further comprising a process for generating the image data, and reading out the image data in the order in which the plurality of second buffers stores the image data, coding the image data and storing the coded image data in the first buffer which are controlled to start simultaneously.

* * * * *